United States Patent [19]

Foster

[11] Patent Number: 4,537,647
[45] Date of Patent: Aug. 27, 1985

[54] METHOD FOR APPLYING TURBULATORS TO WIND TUNNEL MODELS

[75] Inventor: Clark B. Foster, Seattle, Wash.

[73] Assignee: The Boeing Company, Seattle, Wash.

[21] Appl. No.: 433,189

[22] Filed: Oct. 6, 1982

[51] Int. Cl.³ .................. B29C 19/00; B32B 31/00; B28B 3/06; B05D 1/32
[52] U.S. Cl. .................. 156/245; 156/247; 156/289; 264/297.1; 264/313; 427/282; 73/147
[58] Field of Search ............ 264/313, 297, 251, 264; 427/282, 272; 156/231, 232, 238, 249, 245, 247, 289, 307.7, 303, 344, 71; 244/119, 4 A, 132; 46/76 R, 79, 74; 73/147, 583, 802, 804, 861.32

[56] References Cited

U.S. PATENT DOCUMENTS

| | | | |
|---|---|---|---|
| 3,499,781 | 3/1970 | Krueckel | 427/282 |
| 3,791,207 | 2/1974 | Jackson, Jr. et al. | 73/147 |
| 3,825,643 | 7/1974 | Hillier et al. | 264/297 |
| 4,024,837 | 5/1977 | Snyder | 427/282 |
| 4,323,593 | 4/1982 | Tsunashima | 427/282 |
| 4,372,157 | 2/1983 | Caruthers et al. | 73/583 |

FOREIGN PATENT DOCUMENTS

| | | | |
|---|---|---|---|
| 47-34814 | 9/1972 | Japan | 427/282 |
| 208430 | 12/1982 | Japan | 73/147 |

Primary Examiner—Edward Kimlin
Assistant Examiner—Louis Falasco
Attorney, Agent, or Firm—H. Gus Hartmann; Bernard A. Donahue

[57] ABSTRACT

A method for forming turbulators on scale model airplanes used in wind tunnel testing for accurately simulating a transition point on the model surface equivalent to that produced on the full scale airplane. The transition point is where the boundary layer airflow goes from a laminar airflow condition to a turbulent airflow condition. The method relates to applying a perforated tape mask (14) to the model surface (12) at a predetermined location and filling the perforations (15) with a fast cure epoxy (17). After the epoxy has cure hardened, the tape mask (14) is peeled off in the direction of the arrow (16), leaving a series of in situ formed disk turbulators (10) which function to produce the transition point on the model surface.

6 Claims, 3 Drawing Figures

U.S. Patent  Aug. 27, 1985  4,537,647
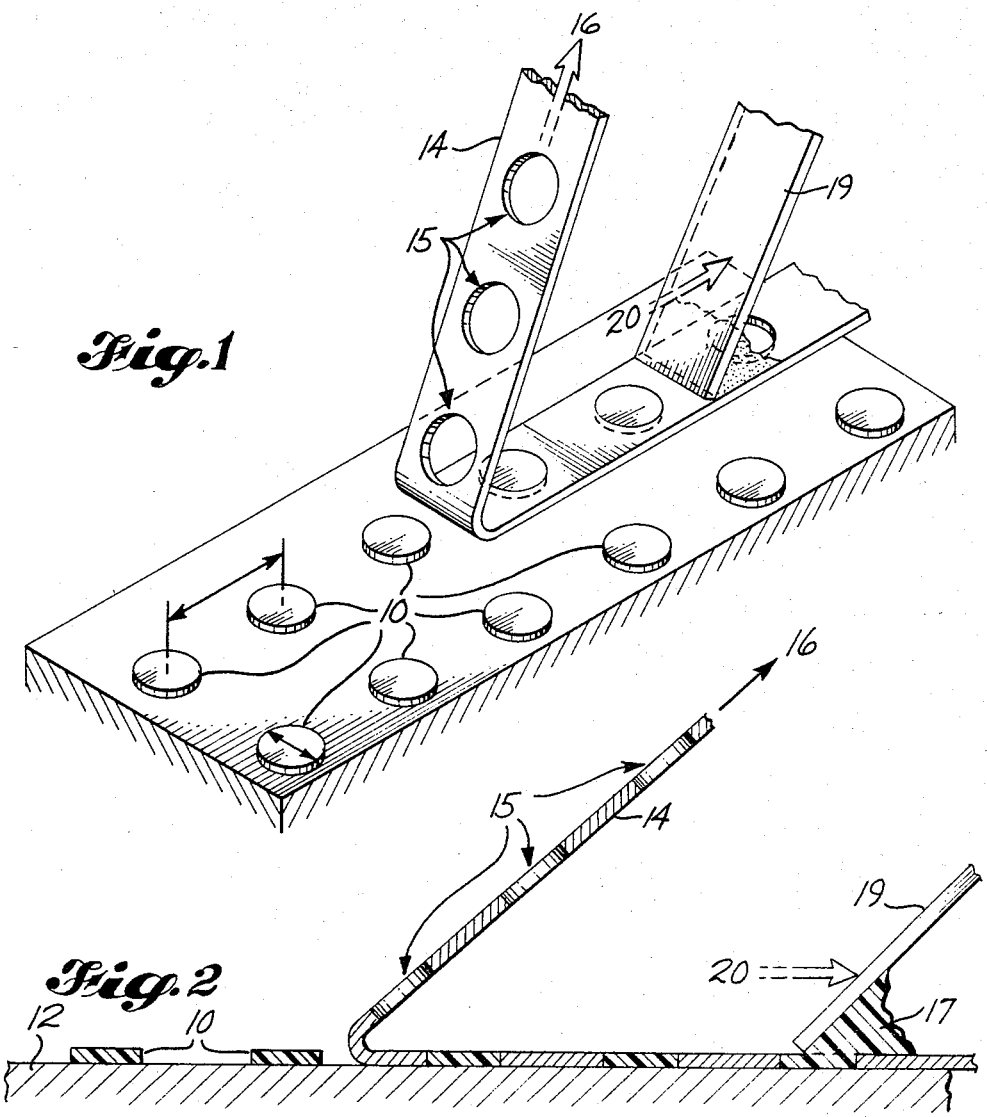
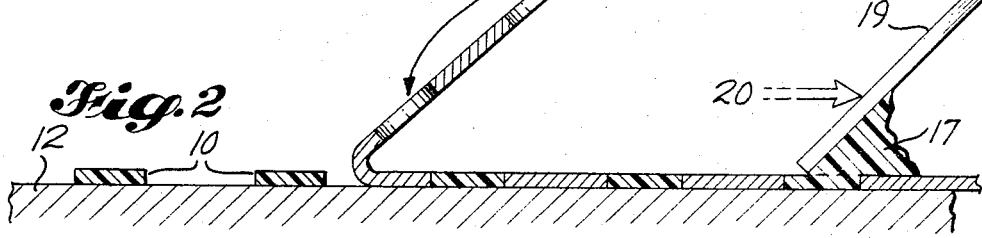
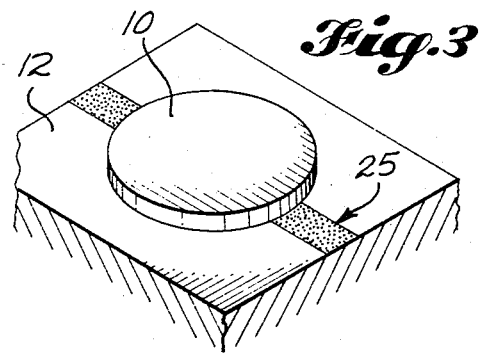

METHOD FOR APPLYING TURBULATORS TO WIND TUNNEL MODELS

BACKGROUND OF THE INVENTION

1. Field of the Invention

On scale model airplanes which are used in wind tunnel testing to simulate or predict certain aerodynamic characteristics of the full-sized airplane, there is considerable difficulty in accurately producing a transition point on the model surface; and this invention relates to an improved method for applying turbulators to the model airfoil surfaces. Turbulators are used on the scale model airplane to simulate the transition point that occurs on the full-sized airplane, and this transition point is where the boundary layer airflow adjacent to the surface goes from a laminar airflow condition to a turbulent airflow condition, and this occurs at a percentage of the airfoil chord.

2. Description of Prior Art

One known method for producing a transition point of laminar airflow to turbulent airflow on a wing surface of a wind tunnel test model is to bond a narrow strip of sandpaper spanwise along the surface of the wing being tested.

Another known method is to apply an adhesive band spanwise along the surface of the model wing and then sprinkle grit onto the adhesive to produce a rough textured strip for producing some type of airflow agitation, hopefully resulting in a transition point. However, one problem with the sprinkled grit method is that the resulting rough textured strip varies depending upon the person applying it.

Both the sandpaper method and the sprinkled grit method either wear away rapidly or particles thereof are knocked off by the debris in the high velocity airflow of the wind tunnel; also, due to the duration of the wind tunnel tests, the grit particles wear away and have to be replaced to the original grit texture, which is generally not possible because of the human inconsistency element.

In order to eliminate the problems associated with the aforesaid sandpaper and sprinkled grit methods, another known method was developed wherein small diameter disks of aluminum were individually bonded onto the model surface. This method was a great improvement and produced predictable and repeatable results; and, in addition, the aluminum disks were much more durable from the standpoint of wear and being knocked off by debris. However, there is still a large factor of diversity associated with this aluminum disk method due to: the amount of adhesive applied to each individual aluminum disk; the size of the fillet of adhesive around the base of the disk; and the variations in spacing distances between the disks caused by their individual positioning by hand.

The present invention is a further inprovement over the aluminum disk method by solving the diversity problem through the use of a perforated tape mask and the in situ forming of the disks. Further, the need for the separate application of an adhesive to the disks for bonding to the model surface is eliminated by using an epoxy or an epoxy plus metal powder mixture squeegeed into the disk-sized perforations in the tape mask. The overall time of the in situ forming of the epoxy disks is drastically decreased from the aforesaid methods for producinq a transition point on a model surface; and the reproduction consistency of the epoxy disk method is substantially less dependent upon the worker's expertise.

SUMMARY OF THE INVENTION

The invention relates to wind tunnel test models and, more particularly, to a method for applying turbulators to the model airfoil surfaces. Turbulators are used to simulate a transition point i.e., where the boundary layer airflow over the surface of an airfoil goes from a laminar airflow to a turbulent airflow condition, that occurs on a full scale airplane in flight. On the full scale airplane, the transition point, in the case of the wing, will occur some distance aft of the wing leading edge, which may be several feet, and that transition point is determined to a great extent by a factor termed "Reynolds Number". On a wind tunnel test model, the Reynolds Number may be such that, without turbulators, the transition point may not occur until after the airflow has gone past the trailing edge of the wing being tested; i.e., the airflow may remain laminar over the entire surface of the model wing. This is not a desired result because it does not simulate the same effect that occurs on the actual airplane. Therefore, in order to produce the same transition point relative to the percent chord of the wing being tested, turbulators are applied to the surface of the model.

An object of the invention is to make the airflow over the surface of a model airplane, such as the wing, go from a laminar airflow condition to a turbulent airflow condition at a particular location on the model wing, which is usually some percentage of the wing chord, and this will determine the location of the turbulators.

BRIEF DESCRIPTION OF THE DRAWINGS

FIG. 1 is a perspective view of a portion of a model surface illustrating schematically the method for in situ forming a series of epoxy disks utilized for creating a transition point of laminar airflow to turbulent airflow.

FIG. 2 is a side view of FIG. 1.

FIG. 3 is a detailed perspective view showing one of the epoxy disks of FIG. 1 positioned over a graphite line which acts as a release agent for aiding removal thereof.

DESCRIPTION OF THE PREFERRED EMBODIMENT

FIGS. 1 and 2 are perspective and side views, respectively, and schematically illustrate the method for in situ forming of disk turbulators 10 onto a wind tunnel model surface 12. The tape stencil 14 is pliable and has an adhesive backing so that it can be adherently attached to compound surfaces that aerodynamic models generally have, such as: along the leading edge of both the inner and outer surfaces of engine inlet cowling; along the leading edge of horizontal and vertical stabilizers; along upper and lower leading edge surfaces of an airfoil; and, in general, most of the leading edge surfaces of the model. In selecting the tape for the tape stencil, certain properties are required, such as pliability, thickness and compatibility with the disk turbulator material.

For the in situ forming of the disk turbulators 10, an epoxy resin 17 is swept onto the tape stencil 14 and into the perforations or circular holes 15. A squeegee 19 is used to sweep, in the direction indicated by arrow 20, an epoxy resin 17 over the surface of the tape stencil 14 and to apply a firm pressure to the tape stencil surface for both filling the perforations and scraping off the excess epoxy resin 17 level with the upper surface of the tape stencil 14 before the epoxy resin has time to cure harden. After the epoxy resin 17 has cure hardened, the tape stencil 14 is peeled off in the direction indicated by arrow 16, leaving a deposit of disk turbulators 10. The thickness of the tape stencil 14 will substantially determine the overall height of the disk turbulators 10.

FIG. 3 is a detailed perspective view of one of the epoxy disk turbulators 10 positioned over a band 25 of a release agent, such as graphite, which functions to decrease the bond between the in situ formed epoxy disk turbulator and the model surface 12, and makes removal easier. When laying out the location for the application of the trip disks, a graphite line is marked on the surface of the model and the vinyl tape is applied with the pre-punched holes of approximately five-hundredths of an inch in diameter (0.05" dia.) centered on that line and the epoxy disks are formed in situ. When it becomes necessary to remove the epoxy disks, a plastic scraper can be used and the epoxy disks are easily flicked off the model surface. Occasionally, a model will have a poorly painted surface which is very sensitive to removal; so, a graphite line is used as a release agent and the epoxy disks are cleanly removed without lifting off paint or damaging the painted surface.

The width of the graphite line should be proportional to the diameter of the disk e.g., if the graphite line is 0.02" and the disk diameter is 0.05", there will be approximately half of the bond strength of the in situ formed epoxy disks left, and this has been found satisfactory for most of the wind tunnel test models. Of course, if the graphite line is made the full width of the epoxy disks, then when the vinyl tape is peeled off, the epoxy-filled holes or disks will also come off, because the bond between the epoxy and the surface of the model has been ruined.

Other means, such as felt pens, ball-point pens, etc., have been found to contribute, at least to a small degree, in being able to remove the epoxy disks easier; however, for consistency and repeatability, they have been found to be less desirable than graphite.

On calibration models, it is generally desired that the trip be very durable and that it remain on the model surface for the duration of the model; therefore, the model surface where the epoxy disks are to be formed in situ should be completely free of any contaminates in order that a very durable epoxy bond is formed. So, for the removal of these epoxy disks, a commercially available epoxy softener is used, such as an epoxy paint remover. Some of the epoxy softening chemicals may work faster than others; however, for the very precise calibration models, it is much more important to retain the integrity of the model surface than it is to be concerned with the speed of disk removal. For models having bare metal surfaces, it is usually desirable to dissolve the epoxy disks off, and for models having other than a bare metal surface such as a painted surface, the epoxy disks will have to be carefully sanded off because removing them with a scraper may also lift off the paint.

The reason for applying turbulators, such as the epoxy trip disks of the present invention, is to make the boundary layer airflow over the surface of the model airplane, such as an airfoil surface, go from a laminar boundary layer airflow condition to a turbulent airflow condition at a particular location on the wing surface, which is usually a percentage of the airfoil chord.

Through experimentation, it has been determined that there is a definite effect on wind tunnel aerodynamics data of certain variables of the epoxy disk-type turbulators of this invention, such as: height of the disk turbulator above the surface of the model; diameter of the disk; and spacing between the disks. The height of the disk turbulator is determined by the Mach number at which the wind tunnels test are run and size of the model being tested.

As the wind tunnel airflow velocity or the free airstream flow velocity increases, the more sensitive the laminar boundary layer airflow is to aggravation or tripping to turbulent flow; therefore, as the wind tunnel airflow Mach number is increased, the height of the disk turbulator above the surface of the model is decreased.

As the scale size of the model is increased, both the height of the disk turbulator and the thickness of the boundary layer also increase relatively proportional to the scale size change, because the desired location on the model airfoil surface of the transition point of laminar airflow to turbulent airflow is at a certain percent of the airfoil chord.

With respect to preparation of the model surface for a satisfactory bond of the trip disks, generally the model has two types of surfaces i.e., bare metal or painted. Many models are required to be very precise i.e., calibration models and those for use in the cryogenic wind tunnel, and the surface variations that paint introduces, particularly on the airfoil section, is so severe that it is not acceptable. Therefore, there are different surface preparations for application to painted or bare metal surface which may be aluminum, steel or some metal alloy.

For a painted model surface, the strongest solvent without damaging the paint is used for removing surface contamination. In the environment of the wind tunnel, there is generally some oil entrained in the airstream which will contaminate the model surface. Also, during some tests, oil is used for flow visualization and to improve photograph results. Therefore, when epoxy disks are to be re-applied to these oil contaminated surfaces, not only is solvent used (Toulene, Benzine, Alcohol, etc.) to clean the oil off, but quite often, a light sanding of the model surface is required in order to make certain that the last contaminated paint layer has been removed so that the surface is oil-free and dry for the bonding process.

For preparing bare metal surfaces contaminated with oil, the model surface is washed with the best solvent that will remove oil, and that is generally Methol Ethyl Ketone, or M.E.K., which is a well-known chemical degreasing compound that many chemical companies make; and then the surface is wiped dry. If the M.E.K. is left to evaporate until the surface is dry, it will just redeposit the same contaminates that it has dissolved. Therefore, as soon as the surface is washed with M.E.K., it should be wiped dry before it has time to evaporate, and as soon as possible thereafter, apply the vinyl tape onto the model surface and sweep on the epoxy resin.

Occasionally, wind tunnel tests have been run under conditions where the surface of the model is cool, such as running at low airspeeds and where it is very cold outside and some of the cold outside air is mixed with the bottled-up wind tunnel air; and, in those instances, heat lamps are used to warm up the surface of the model before applying the tape and epoxy resin. Because, for an epoxy that has a cure time at room temperature of 70° F. of ten minutes, at a temperature of 50° F., the cure time may be forty minutes; therefore, to expedite the cure time, the model is heated.

In fabricating tape to be used for in situ forming of epoxy disks, a roll of tape e.g., vinyl tape, is unreeled onto a backing strip or liner. The backing strip characteristics desired are that it will bend but not stretch; and it is utilized for lending rigidity to the vinyl tape for further processing operations. The vinvl tape, with its backing strip, is then sent through a hole-punching machine which indexes the tape and punches predetermined diameter holes e.g., five hundredths of an inch in diameter (0.05" dia.) at distance intervals of one-tenth of an inch (0.1") on centers. The perforated vinyl tape is then wound onto a supply reel from which the tape is removed as needed.

With respect to the hole-punching operation, it was found that, in order to produce sharp and clean holes, the face of the punch had to be slanted approximately ten degrees and that the punching direction had to be from the backing strip toward the vinyl tape.

If the punching direction is from the vinyl tape towards the backing strip, a dimple or slight depression was formed around the upper edge surface of the hole; and when the epoxy resin was swept onto the tape for in situ forming of the disks, and the epoxy hardened and the vinyl tape was peeled off the model surface, the remaining epoxy disks had an upper flange or flashing around the upper edge.

However, if the punching direction is from the backing strip towards the vinyl tape, the flashing problem is substantially eliminated. There is a slight dimple effect on the bottom, or adhesive side of the vinyl tape, but when the prepunched tape is removed from the backing strip and positioned on the model surface, a firm pressure is applied to the tape in order to push the lower corner or edge of the hole tightly against the model surface so that when the epoxy resin is squeegeed into the holes, there is no leakage or propagation of epoxy resin underneath the vinyl tape.

Further, by punching through the backing strip first, there is not only produced a very clean and sharp edge around the finished epoxy disk, but also, upon close examination with a microscope, it was found that the external shape of the disk was squared and not conical, which is to be avoided.

Another purpose for applying the backing strip to the vinly tape is to provide both an increase in shelf-life and a stabilizing effect to the dimensional tolerances of the vinyl tape; e.g., it was found that, if the vinyl tape, without a backing strip, was sent through the hole-punching machine and then wound onto a storage roll, when the tape was reapplied to the same model after a six-month period from its initial application, the tape had deformed in some manner, such as shrinking or expanding, which may have been attributable to storage conditions. Therefore, by applying a backing strip to the vinyl tape, an increase in shelf-life and dimensional stability is achieved.

Normal room temperatures (70° F.) and humidity conditions have been found satisfactory for vinyl tape storage and it is not necessary to chill it; however, some increase in shelf-life is achieved at the cooler temperatures above freezing. Occasionally, when the tape is applied to a model that has been undergoing wind tunnel testing, the model temperature might be 100° F.-125° F.; and at these temperatures, care has to be taken because pliability, stretching and expansion of the vinyl tape increases considerably. The vinyl tape cannot be left in the heated environment of the wind tunnel very long before irreparable distortion takes place. So, in applying the vinyl tape to a model at temperatures of up to 125° F., the tape is kept either outside the wind tunnel at room temperature or in a chilled container until just before application to the surface of the model. All of the preliminary preparations, such as removing eroded disks, sanding and cleaning the surface, are done before the vinyl tape is brought into the wind tunnel and applied to the model. In many of the wind tunnel test experiments, the trip disks are changed due to erosion, missing disks are replaced, the trip disks are relocatd slightly forward or rearward in order to produce the desired transition point i.e., where the laminer airflow transitions to turbulent airflow.

Positioning of the trip disks on the model surface is determined by where they will simulate the transition from laminar airflow to turbulent airflow and, in the case of a wing, at the same percent of wing chord as would occur on the full-sized airplane traveling at the same Mach number, e.g., to simulate a landing condition where the airplane is at relatively slow flight, the transition point may occur at 50% of the wing chord. Whereas, when the airplane is at the cruise flight condition or higher airspeed, the transition point will occur further forward at say 10% of the wind chord. Therefore, in order to simulate these difference transition point locations on the model wing, the trip disks have to be removed and reapplied at new locations; and these new locations are derived from calculations and flow visualization.

Compatibility of the tape with difference types of epoxy resin mixtures used for in situ forming of the disks: fiber reinforced tape leaves fiber ends projecting into the punched out holes or perforations that are filled with epoxy resin for in situ forming of the trip disks and, when the resin has cure hardened, the fiber ends become embedded in the hardened epoxy. When the tape is peeled off the model surface, many of the epoxy formed disks are rendered useless or come off with the removal of the tape. Therefore, non-reinforced tape, preferably, is used.

Most vinyl tapes have been found to be satisfactory because those epoxy resin mixtures found acceptable for in situ forming of the trip disks, when cure hardened, will not substantially bond to the vinyl tape to the extent that the epoxy-formed disks come off when the vinyl tape is peeled off the model surface.

Polyvinyls and polypropylene-type tapes have also been found satisfactory; however, teflon has been found to be too tough and not sufficiently pliable for use on compound contoured surfaces.

With respect to selection of epoxy resins, the most satisfactory for use on the models running in the wind tunnel have a cure rate of between 5–10 minutes. This provides enough time to apply a sweep of epoxy resin over the vinyl tape and get it correctly swept into the perforations before its sets up; and therefore, wastes little wind tunnel test set-up time.

However, when the trip disk applicaton to the model is being performed in the shop area where there is less of a time constraint, an epoxy resin having a cure time of up to one-half hour to one hour is used; because this provides sufficient time to apply the epoxy resin all over the model with one batch, rather than mixing up many quick-curing batches for each particular section of the model surface.

Another important property of the selected epoxy is viscosity. A high viscosity epoxy having a heavy paste-like mixture is preferred because it will adhere to vertical and inverted surfaces without pouring out of the holes of the mask. An epoxy having too low a viscosity will produce dished surfaces or disks that have a slanted surface depending upon the gravitational effect; therefore, a high viscosity or heavy-bodied epoxy with a five- to seven-minute cure time has proven to be the best. A brand that has been found satisfactory is made by 3M and is identified as 3501 which has a high aluminum content.

Another important property in the selection of an epoxy is pliability or resiliency when in the fully cured hardened state. Rigid or brittle epoxies have a tendency to erode, chip or break off due to debris in the high velocity wind tunnel; and those epoxies having pliable or rubbery characteristics are more resistant to wind tunnel erosion. The resilient epoxies have a life durability many times that of the known sprinkled grit method and many times that of the known bonded-on aluminum disk method; in fact, certain types of epoxies have satisfactorily been in wind tunnel tests for months.

Manufacturers of epoxy resins identify some of the important properties i.e., cure time and viscosity; and a specific request has to be made for a durometer range of the cured epoxy in order to determine the degree of pliability.

Another important feature of the epoxy resin mixture is the addition of certain elements such as aluminum powder. The addition of certain metallic and non-metallic elements has been found to be beneficial for some types of wind tunnel tests such as in a cryogenic wind tunnel.

With respect to the laminar airflow layer, the airflow directly on the model surface is at zero velocity and then at increments of a thousandth of an inch away from the surface to, maybe, ten-thousandths of an inch where the airflow velocity approaches that of the free airstream flow, comprising the laminar airflow layer. The height of the disks is made to just reach through this laminar layer and touch the free airstream flow; and this is the desired disk height for producing a very effective trip. If the height of the disk is such that it remains within the laminar airflow layer, it will not be effective in creating a trip; and if the height of the disk is such that it protrudes too far into the free airstream flow, it will excessively contribute to the drag of the model. Aerodynamicists do not like to concern themselves with having to pick out the effects of the trip drag from the model drag test results. Therefore, the height of the trip disks is one of the most important factors in accurate wind tunnel test results; and the minimum drag possible is produced by having the height of the trip disks such that they just barely touch the free airstream flow and cause the laminar airflow layer to trip and become turbulent. The desired aerodynamic result of the trip disks is to cause the airflow to go from a laminar airflow condition to a turbulent airflow condition at a particular location on the surface of the model which simulates the same occurrence or condition that takes place on the full-sized airplane, and to accomplish this with the least effects of the model's trip drag.

The majority of wind tunnel test models are in the range of 1/10 to 1/16 scale and the height of the disks should be such that they protrude into the free airstream flow a few thousandths of an inch. Therefore, a selection of vinly tapes having a thickness variation in increments of two-thousandths of an inch are satisfactory and a series range of two- to ten-thousandths of an inch is adequate for most all model testing. Also, this entire range of tape thicknesses is generally available on the commercial market and most tape manufacturers' thickness tolerances or variations are within one-half of one-thousandth of an inch, which is satisfactory for most wind tunnel model testing, except for calibration models, where the primary concern is for absolute repeatability.

With respect to the spacing or the distance between the disks, a parametric study was undertaken regarding the various effects of disk size, shapes other than disk, spacing and height; and the results concluded that the most dominant variable was height. The height of the trip was much more influential on the effectiveness of the trip than either the spacing, shape or diameter of disks; and the most effective spacing relative to disk diameters is approximately one to one. Further, this spacing is not critical and a two diameter spacing will still produce an effective trip.

With respect to the arrangement of the disks, the number of rows, even if staggered, does not produce as significant an increase as with increasing the height of the trip a very small amount.

Multiple rows of trip disks are slightly more effective in producing a trip than a single row; but is does not justify the complication and time for applying them.

Experiments with various shapes i.e., triangular, square, star and disk, have shown that for a given area the disk is least effective. However, the complications in manufacturing punch and die sets for punching out these various shapes, other than disk, did not justify the expense; also, it is difficult to correctly orient these shapes, other than disk, relative to the direction of the free airstream flow in order to produce vortices off the corners, e.g., a triangle having the same area as the disk will be more effective in causing a trip, but it is difficult to orientate the triangle correctly to have a corner point directly into the airstream in order to produce vortices off the aft corners. Whereas, with a disk shape, there are always two edges at right angles to the direction of airflow from which vortices can shear off. The experimental results indicated that the disk shape is a very simple way of getting the job done and that it is much more effective to vary the height of the trip than it is to fool around with any other parameter; and the height of the trip can be easily varied by changing the tape thickness.

With respect to the trip disk size vs. model size, most of the wind tunnel test models are approximately one-tenth (1/10) to one-sixteenth (1/16) scale and a disk diameter of five-hundredths of an inch (0.05") with a one-tenth inch (0.1") spacing between centers works satisfactorily. For a model smaller than 1/16 scale, the size of the trip would be correspondingly reduced in order to retain a comparable ratio between the size of the trip and the size of the wing chord; e.g., if the size of the trip band is a significant portion or percent of the wing chord, it will provide an ambiguous region for where the transition point is actually occurring. As the trip disk percentage of chord size is reduced, the ambiguous region, or band width, decreases to provide a much more precise location for the transition point. For small models, less than 1/16 scale, a disk diameter of 0.05" may become 2% of the airfoil chord which is too significant a factor. For models larger than 1/10 scale, a disk diameter of 0.05" would be perfectly satisfactory from the precise location aspect of the transition point, but, in order to penetrate into the free airstream flow, the disk height required may be too great and produce an unstable disk column; because, for triggering the laminar airflow to turbulent airflow, the boundary layer may be two-hundredths of an inch (0.02") or more thick.

When the trip on the model surface varies or changes dimensionally by some of the disks breaking away or wearing down, the location at which the transition point occurs and/or the effectiveness of the trip will also vary; and this will affect the accuracy of the wind tunnel test results. However, the degree of inaccuracy may not be readily apparent and, unless repeat runs are made, the inaccuracies may not be discovered. Sometimes an entire series of tests may be duplicated as many as three or more times in order to make certain of accuracy and consistance in the data. This is why it is important to have repeatability in the trip without having to depend upon the skill of the applicator.

With respect to the known, individually bonded aluminum disk method, the skill of the person applying the aluminum disks is a significant variable which will affect the repeatability of the test results, e.g., assume the application to the model surface of an aluminum disk of 0.007" height and where the thickness of the adhesive adds 0.003" to the total height of the disk above the surface of the model and with, perhaps, a fillet of adhesive around the base of the aluminum disk. This 0.003" variation is a significant amount relative to a 0.007" disk height; and the intrusion of this additional 0.003" into the free airstream flow may produce model drag results that had not been anticipated.

The present invention eliminates many of the variables attributable to the applicator's skill because all that is required is that the person be able to apply a given thickness of a pre-punched tape to the surface of a model. The tape thickness will precisely limit the disk height. Sometimes, depending upon how firmly the squeegee is pushed down as the epoxy resin is leveled with the surface of the tape, an unskilled person may be able to vary the disk height by one-half of one-thousandths of an inch (0.0005"). If this is a concern, a slight amount of epoxy can be left on the surface of the tape and, after the epoxy resin has cure hardened, a very light sanding operation with the tape left on the model surface will gradually expose the tape surface through the opaque epoxy; and this is a very precise method for producing an exact trip disk height. This sanding method is used on calibration models where it is necessary to produce absolute predictability.

The only real concern is that because a pliable tape is used, the person applying it to the surface of the model could distort the disks by pulling and stretching the tape during application. However, this can be taken care of by marking the tape at predetermined increments e.g., one inch, while the backing strip is attached to the tape; then, after the backing strip is removed and the tape applied to the model surface, the pre-marked increments are checked for accuracy, such as with a pair of dividers. A stretch of one or two percent is not considered significant.

One of the main concerns is the erosion rate and loss of the trip on the model surface during wind tunnel tests.

With respect to the known sprinkled grit method, the grit will wear down at a relatively predictable rate which is generally along an exponential curve i.e.: for the first hour of wind tunnel running time, 5% of the grit is lost; in the next two hours, another 5% is lost, in the next three hours, another 5% is lost; in the next five hours, another 5% is lost; etc.

With respect to the known method of individually bonded aluminum disks, the erosion rate is substantially less than the aforesaid sprinkled grit method; however, their rate is approximately linear at a couple of percent loss per hour of running time.

With respect to the present invention, there is an approximately linear degradation rate of around one-tenth of one percent, which is substantially better than either of the aforesaid known methods.

With respect to removability of the sprinkled grit, the aluminum disks and the epoxy disks, there are advantages in the epoxy disks over the others.

Removal of the sprinkled grit requires the use of a solvent and, sometimes, the surface of the model has to be sanded to remove the grit.

Removal of the individually bonded aluminum disks which have a glue fillet around the base of each disk quite often results in gouging the surface of the model because a metal scraper is generally used to break them away from the surface.

In the removal of epoxy disks, due to the vinyl tape application and the in situ forming of the epoxy disks, there is no fillet around the base and they will break off quite cleanly by just using a hard plastic scraper. Also, where there is a well-prepared painted surface, i.e., where the paint has been correctly applied according to specifications, the bond of the paint to the substrate material or metal model will be stronger than the bond of the epoxy disks to the paint; therefore, the epoxy disks will break away from the painted surface without peeling the paint off.

Another feature of the invention relates to a rapid repair and replacement technique for the epoxy disks that have worn down or have been lost due to debris in the wind tunnel striking and breaking them off. Often, there will be a particular damaged area on the model surface where some epoxy disks have completely come off or where they have been severely eroded. This damaged area is cleaned up and a strip of pre-punched vinyl tape is indexed on the remaining surrounding disks; and then epoxy resin is squeegeed into the holes for repairing or forming new disks in situ. Indexing the tape provides the correct positioning of the missing disks, instead of having to eyeball them, as is done by the known method of individually bonding aluminum disks. Due to this rapid repair and replacement technique, there is very little degradation or variation of the trip disks as wind tunnel testing continues; and another desirable feature is that there is greater uniformity and consistence in the test results. For many wind tunnel tests, absolute precision of the trip disks is not required. However, for calibration models, absolute precision and repeatability in both height and position of the trip disks is essential.

Cryogenic wind tunnels having a cold environment of −240° F. produce Reynolds Numbers that are relatively close to those of the full scale airplane in flight. However, it is still necessary to produce a transition point at a particular location on the model surface.

With respect to the sprinkled grit method, the adhesives normally used will not stand up in the cold environment of −240° F. and the grit just flakes off.

With respect to the individually bonded aluminum disk method, the variation in thermal expansion between the aluminum disk and the bonding agent causes a very high degree of failure.

The present invention has been found to be compatible with the cryogenic environment and produces results for which no known substitute method has been found. Very severe tests have been conducted on the epoxy disks formed in situ on stainless steels and metal alloys that are being used for manufacturing models to be used in the cryogenic wind tunnel; and the epoxy disks have proven to be very durable.

I claim:

1. A method for forming turbulators in situ on the surface of a scale model airfoil used in wind tunnel testing, comprising the steps of: forming a mold by applying an adhesive backed tape stencil having a series of circular apertures, to a predetermined location on said airfoil; filling the apertures in said tape stencil with an epoxy resin; leveling the epoxy resin with the surface of said tape stencil; cure hardening said epoxy resin; removing said tape stencil from said airfoil and leaving in situ formed epoxy disk turbulators on said airfoil; predetermining a thickness of said tape stencil for substantially producing a height of the epoxy disk turbulators which protrudes into free airstream flow in the wind tunnel during testing of said scale model airfoil for producing a transition point on said airfoil.

2. The method set forth in claim 1, including: spacing the series of circular apertures in said tape stencil such that the distance between them is within the range of from approximately one diameter to two diameters.

3. In a method for forming turbulators as recited in claim 1, including: applying a release agent line on the surface of said scale model airfoil prior to the application of said tape stencil; and positioning the series of circular apertures of said tape stencil over said release agent line which functions to decrease the bond area between the in situ formed epoxy disk turbulators and the model surface, thereby making said turbulators more easily removable without damage to the model surface.

4. A method for forming turbulators on an aerodynamic scale model used in wind tunnel testing to simulate a transition point of laminar to turbulent airflow occurring on a full scale aerodynamic craft, comprising the steps of: forming a mold by applying a tape mask having a series of circular perforations, to a predetermined location on said model; filling the series of circular perforations in said tape mask with a cure hardening epoxy resin liquid; removing excess epoxy resin to precisely limit epoxy filled perforations to a surface level of said tape mask; cure hardening said epoxy resin; peeling off said tape mask after the epoxy resin has cure hardened and leaving a series of in situ formed epoxy disk turbulators on said model; predetermining a thickness of said tape mask for substantially producing a height of epoxy disk turbulators which protrude into free airstream flow and function to produce a transition point on the surface of said model during wind testing thereof.

5. The method set forth in claim 4, including: spacing the series of circular perforations in said tape mask such that the distance between them is within the range of from approximately one diameter to two diameters.

6. In a method for forming turbulators as recited in claim 4, including: applying a release agent line on the surface of said scale model prior to the application of said tape mask; and positioning the series of circular perforations of said tape mask over said release agent line which functions to decrease the bond area between the in situ formed epoxy disk turbulators and the model surface, thereby making said turbulators more easily removable without damage to the model surface.

* * * * *